United States Patent
Heijnen

(10) Patent No.: US 11,904,280 B2
(45) Date of Patent: Feb. 20, 2024

(54) FILTRATION SYSTEM AND METHOD FOR FILTERING WATER

(71) Applicant: DuPont Safety & Construction, Inc., Wilmington, DE (US)

(72) Inventor: Martin Heijnen, Greifenberg (DE)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 0 days.

(21) Appl. No.: 17/056,196

(22) PCT Filed: May 29, 2019

(86) PCT No.: PCT/EP2019/063960
§ 371 (c)(1),
(2) Date: Nov. 17, 2020

(87) PCT Pub. No.: WO2019/238425
PCT Pub. Date: Dec. 19, 2019

(65) Prior Publication Data
US 2021/0213388 A1 Jul. 15, 2021

(30) Foreign Application Priority Data
Jun. 12, 2018 (EP) .................................. 18177171

(51) Int. Cl.
*B01D 63/04* (2006.01)
*B01D 61/18* (2006.01)
*C02F 1/44* (2023.01)

(52) U.S. Cl.
CPC ........... *B01D 63/046* (2013.01); *B01D 61/18* (2013.01); *C02F 1/444* (2013.01);
(Continued)

(58) Field of Classification Search
CPC .. B01D 63/046; B01D 61/18; B01D 2313/04; B01D 2313/125; B01D 2313/20;
(Continued)

(56) References Cited

U.S. PATENT DOCUMENTS

| 2006/0175243 A1* | 8/2006 | Mahendran | ............ | B01D 65/08 |
| | | | | 210/321.89 |
| 2008/0135497 A1* | 6/2008 | Fuchs | ................... | B01D 61/18 |
| | | | | 210/321.72 |

(Continued)

FOREIGN PATENT DOCUMENTS

| EP | 2992038 A2 | 3/2016 |
| JP | 2021526970 A | 10/2021 |

(Continued)

OTHER PUBLICATIONS

Gianluca Di Profio et al., "Submerged hollow fibre ultrafiltration as seawater pre-treatment in the logic of integrated membrane desalination systems", Elsevier, Desalination 269 (2011), pp. 128 to 135.

(Continued)

*Primary Examiner* — Pranav N Patel

(57) ABSTRACT

The invention relates to filtration system (20), comprising a tank (40) filled at least partly with water to be filtered, and at least one filtration module (30), the at least one filtration module (30) comprising at least one filter membrane (10) for filtering the water comprising a substrate (12) which is penetrated by at least one capillary (16), and at least one filtrate pipe (32) for drawing filtered water out of the tank (40), whereat the at least one filtration module (30) is arranged in the tank (40) such that the at least one filter membrane (10) is submerged at least partly in the water to be filtered. The at least one filtration module (30) is designed and arranged such that water to be filtered flows into the at least one capillary (16) and from the at least one capillary (16) through the substrate (12) into the filtrate pipe (32). The (Continued)

invention also relates to a method for filtering water by means of a filtration system (20) according to the invention, whereat the water to be filtered is drawn into the at least one capillary (16) and from the at least one capillary (16) through the substrate (12) into the filtrate pipe (32) and from the filtrate pipe (32) out of the tank (40).

10 Claims, 4 Drawing Sheets

(52) U.S. Cl.
CPC .... *B01D 2313/04* (2013.01); *B01D 2313/125* (2013.01); *B01D 2313/20* (2013.01); *B01D 2313/243* (2013.01); *B01D 2313/44* (2013.01); *B01D 2313/54* (2013.01); *B01D 2315/06* (2013.01); *B01D 2315/08* (2013.01); *B01D 2317/04* (2013.01); *B01D 2317/06* (2013.01)

(58) Field of Classification Search
CPC .......... B01D 2313/243; B01D 2313/44; B01D 2313/54; B01D 2315/06; B01D 2315/08; B01D 2317/04; B01D 2317/06; B01D 69/082; B01D 65/02; B01D 63/043; B01D 63/02; B01D 63/04; B01D 69/08; C02F 1/444; C02F 2201/003
See application file for complete search history.

(56) References Cited

U.S. PATENT DOCUMENTS

| | | |
|---|---|---|
| 2011/0114551 A1 | 5/2011 | Suzuki et al. |
| 2016/0108178 A1 | 4/2016 | Weber et al. |
| 2016/0346739 A1* | 12/2016 | Panglisch ............... C02F 1/444 |
| 2017/0001884 A1* | 1/2017 | Panglisch ............... C02F 1/444 |
| 2017/0209834 A1 | 7/2017 | Cohen et al. |
| 2019/0169050 A1* | 6/2019 | Crouch ................. B01D 61/18 |
| 2021/0213388 A1 | 7/2021 | Heijnen |

FOREIGN PATENT DOCUMENTS

| | | |
|---|---|---|
| WO | 2006012920 A1 | 2/2006 |
| WO | 2009008463 A1 | 9/2010 |
| WO | 2015124492 A1 | 2/2015 |
| WO | 2015124600 A1 | 8/2015 |
| WO | 2017046196 A1 | 3/2017 |
| WO | 2017105356 A1 | 6/2017 |
| WO | 2017162554 A1 | 9/2017 |

OTHER PUBLICATIONS

Suez: Water Technologies and Solutions Fact Sheet 2017 pp. 1-2.
Schrotter et al., "Current and Emerging Membrane Processes for Water Treatment", MembraneTechno 2010 pp. 70-72.
PCT International Search Report, dated Aug. 26, 2019, International Application No. PCT/EP2019/063960, filed May 29, 2019; ISA EPO; Beninca Cordes, Carmelita, Authorized Officer.

* cited by examiner

FILTRATION SYSTEM AND METHOD FOR FILTERING WATER

DESCRIPTION

Technical Field

The present invention relates to a filtration system, comprising a tank filled at least partly with water to be filtered, and at least one filtration module, whereat the at least one filtration module comprises at least one filter membrane for filtering the water, and at least one filtrate pipe for drawing filtered water out of the tank, whereat the at least one filtration module is arranged in the tank such that the at least one filter membrane is submerged at least partly in the water to be filtered. The present invention also relates to a method for filtering water by means of a filtration system according to the invention.

Prior Art

Water treatment is one of the most vital applications of filtration processes which thus experience a strong interest not only due to global water scarcity, particularly in drought-prone and environmentally polluted areas, but also due to the continuous need for drinking water supplies and for treatment of municipal or industrial waste water. Typically, water treatment relies on a combination of different methods and technologies, which depend on the intended purpose of the cleaned water as well as on the quality and degree of the contaminated or raw water.

Conventionally, water treatment is based on treatment steps, such as flocculation, sedimentation and multi-media filtration. In recent years, however, membrane technologies such as microfiltration, ultrafiltration, nanofiltration and reverse osmosis have emerged, providing more efficient and reliable filtration processes. Membrane-based processes, such as microfiltration or ultrafiltration, remove turbidity caused by suspended solids and microorganisms such as pathogens like bacteria, germs and viruses from raw water. Further significant advantages of membrane based processes are that considerably less chemical and no temperature treatment is required.

Common membranes for filtration are either flat-shaped membranes or tubular membranes with one or more capillaries. Typically, such membranes are semi-permeable and mechanically separate permeate or filtrate and the retentate from raw water. Thus, the microfiltration and ultrafiltration membranes allow permeate, such as water, to pass and hold back suspended particles or microorganisms as retentate. In this context, vital membrane parameters are, amongst others, the selectivity, the resistance to fouling and the mechanical stability. The selectivity is mainly determined by the pore size usually specified in terms of the exclusion limit given by the nominal molecular weight cut-off (NMWC) in Dalton (Da). The NMWC is usually defined as the minimum molecular weight of a globular molecule retained by the membrane to 90%. For example in ultrafiltration, the nominal pore size lies between 50 nm and 5 nm and the NMWC lies between 5 kDa and 200 kDa. In nanofiltration, the pore size lies between 2 nm and 1 nm and the NMWC lies between 0.1 kDa and 5 kDa. Thus, while ultrafiltration already filters bacteria, viruses and macromolecules, leading to water with drinking quality, nanofiltration leads to partially demineralized water. In reverse osmosis, the nominal pore size shrinks even further, below 1 nm and the NMWC shrinks below 100 Da. Reverse osmosis is thus suitable for filtering even smaller entities, such as salts or small organic molecules. In combining the different filtration technologies, a wide variety of filtration actions can be obtained which may be adapted to a specific intended purpose.

Membranes are usually embedded within a filtration system which allows to feed the raw water and to discharge permeate as well as concentrate. For this purpose, filtration systems encompass an inlet as raw feed and outlets to discharge both permeate and concentrate. For tubular-shaped membranes, different designs of filtration systems exist.

In the document WO 2006/012920 A1 a filtration system for tubular membranes is described. Here the tubular membrane includes multiple capillaries, which are embedded in a porous substrate. The liquid to be filtered flows from or to at least one long inner channel of the capillaries for transporting the liquid to be filtered or filtered liquid. The tubular membrane is disposed in a tubular housing with an inlet and outlets for discharging permeate and concentrate. In particular permeate is discharged through an outlet opening located centrally along the long axis of the tubular housing.

Filtration systems are known that use pressure driven filtration modules. Thereat, water to be filtered is pressed with an overpressure into the filtration modules such that filtrate passes the membranes and flows out of the filtration modules. Furthermore, filtration systems are known that comprise tanks which are filled with water to be filtered. Thereat, filtration modules are submerged in the water within the tank. Water is drawn with negative pressure, that means pressure which is smaller than atmospheric pressure, through the membranes of the filtration modules out of the tank.

The document WO 2015/124492 A1 discloses a filtration module for filtering fluids, inter alia water. The filtration module comprises a filtration element which includes a membrane arrangement and a permeate collecting tube. The membrane arrangement includes several filter membranes for microfiltration, ultrafiltration or nanofiltration, whereat each filter membrane comprises several capillaries.

The document WO 2017/046196 A1 discloses a filtration system for filtering liquid, inter alia water. The filtration system comprises several filtration modules which are connected to inlet pipes for feeding liquid to the filtration modules and to an outlet pipe for discharging filtrate from the filtration modules.

In the document WO 2017/162554 A1 a method for fabricating filter membranes is disclosed. Thereat, a material of a substrate and a bore fluid are fed to a spinneret and the filter membranes are formed as tube-like strings. The spinneret is designed such that several bores are formed within the substrate that extend in an axial direction. Said bores form capillaries of the filter membranes.

The document US 2011/0114551 A1 discloses a submerged hollow fibre membrane module which includes a cylindrical housing. Hollow fibre membrane bundles are placed vertically in the cylindrical housing. The cylindrical housing comprises a peripheral wall that is partly composed of a porous component allowing water to enter into the cylindrical housing. Water within the cylindrical housing is drawn in radial direction into the hollow fibre membranes and exits the hollow fibre membranes at a front side. Hence, the hollow fibre membranes are used as out-to-in-membranes.

The article "Submerged hollow fibre ultrafiltration as seawater pre-treatment in the logic of integrated membrane desalination systems" by Gianluca Di Profio et al., Elsevier, Desalination 269 (2011), pages 128 to 135, describes a test system for filtration of seawater as a pretreatment for desalination. Thereat, hollow fibres are oriented in a vertical arrangement and are submerged in a tank that contains seawater. Filtration is carried out in outside-to-inside mode.

It is an object of the invention to provide a filtration system for water with filtration modules that are submerged in the water within a tank, being easy to build and maintain and having a high flow rate of filtered water.

SUMMARY OF THE INVENTION

This object is achieved according to the present invention by a filtration system comprising a tank filled at least partly with water to be filtered and at least one filtration module. Thereat, the at least one filtration module comprises at least one filter membrane for filtering the water and at least one filtrate pipe for drawing filtered water out of the tank. The at least one filter membrane comprises a substrate which is penetrated by at least one capillary. Thereat, the at least one filtration module is arranged in the tank such that the at least one filter membrane is submerged at least partly in the water to be filtered which the tank is filled with.

The substrate of the filter membrane is porous and semi-permeable and mechanically separates filtrate and the retentate. Thus, the substrate of the filter membrane allows permeate, such as pure water, to pass and hold back suspended particles or microorganisms as retentate. The substrate of the filter membrane can be made of at least one polymer, in particular at least one soluble thermoplastic polymer. The at least one polymer can be selected from polysulfone (PSU), polyethersulfone (PESU), polyphenylenesulfone (PPSU), polyvinylidene chloride (PVDC), polyvinylidene fluoride (PVDF), polyvinyl chloride (PVC), polyacrylonitrile (PAN), polyphenylenesulfone, polyarylether, polybenzim-idazole (PBI), polyetherimide (PEI), polyphenyleneoxide (PPO), polyimide (PI), polyetherketone (PEK), polyetheretherketone (PEEK), cellulose acetate and copolymers composed of at least two monomeric units of said polymers. Preferably the at least one polymer is selected from polyethersulfone (PESU), polysulfone (PSU), polyvinylidene chloride (PVDC), polyvinylidene fluoride (PVDF), cellulose acetate, polzacrylonitrile (PAN) and copolymers composed of at least two monomeric units of said polymer. The polymer can also be selected from sulfonated polymers selected from the group consisting of polyarylether, polyethersulfone (PESU), polysulfone (PSU), polyacrylonitrile (PAN), polybenzimidazole (PBI), polyetherimide (PEI); polyphenyleneoxide (PPO), polyvinylidenfluoride (PVDF), polyimide (PI), polyetherketone (PEK), polyetheretherketone (PEEK), polyphenylenesulfone and copolymers composed of at least two monomeric units of said polymers.

According to the invention, the at least one filtration module is designed and arranged within the tank such that water to be filtered flows into the at least one capillary of the at least one filter membrane and from the at least one capillary through the substrate of the at least one filter membrane into the filtrate pipe of the at least one filtration module. The at least one capillary forms an inner surface within the substrate. The substrate has an outer surface that is directed outwards and that surrounds the substrate. Hence, the water to be filtered enters the substrate through said inner surface, passes through the substrate and the water exits the substrate through said outer surface.

The filtration system according to the invention has a high packing density. That means, compared to other filter systems, more filter modules can be arranged within the same area in the tank. Hence, the membrane area of the whole filtration system is enlarged and flow rate of filtered water is increased.

Furthermore, backwash operation can be performed for cleaning the at least one filter membrane. Backwash drain can be drained out of the tank, for example, by means of a drain pump. Also capillary drain can be performed by pumping off the water from the tank. Chemical enhanced backwash can also be performed.

Preferably, the at least one filter membrane comprises several capillaries penetrating the substrate. Thereat, the several capillaries are separated from each other by parts of the substrate. In particular, the filter membrane comprises seven capillaries that are arranged next to each other and that are surrounded by the substrate. Each capillary forms an inner surface. Hence, an active filter area defined as a sum of the areas of the inner surfaces of all capillaries within the substrate is larger than an exit area defined as the area of the outer surface surrounding the substrate.

According to an advantageous embodiment of the invention, the at least one filter membrane of the at least one filtration module has a cylindrical shape, in particular a circular cylindrical shape, extending in an axial direction. Thereat, the at least one capillary also extends in the axial direction. Preferably, the at least one capillary also has a cylindrical shape, in particular a circular cylindrical shape. As mentioned above, preferably, the at least one filter membrane comprises several capillaries which extend parallel to each other. Thereat, the length of the filtration modules can easily be adapted to the dimensions of the existing tank by using filter membranes that have appropriate extension in axial direction.

According to a preferred embodiment of the invention, the at least one filtrate pipe of the at least one filtration module extends in the axial direction parallel to the at least one filter membrane. Thereat, the at least one filtrate pipe is penetrated by openings extending in a radial direction such that water flows from the at least one filter membrane through said openings into the at least one filtrate pipe. Preferably, the at least one filtrate pipe has a hollow cylindrical shape defining a hollow space inside through which the filtered water can be drawn out.

Preferably, the at least one filtration module comprises a casing extending in the axial direction and surrounding the at least one filter membrane and the at least one filtrate pipe in circumferential direction. Thereat, the casing is made of a material which is not porous and hence the casing is not permeable for water. In particular, the casing also has a hollow cylindrical shape defining a hollow space inside.

According to an advantageous embodiment of the invention, the at least one filtration module comprises at least one sealing arranged within the casing in a region near a front side of the at least one filter membrane. Thereat, the sealing surrounds the at least one filter membrane and the at least one filtrate pipe in circumferential direction. The sealing is made of a material which is also not permeable for water, for example a resin. Hence, the sealing prevents water from flowing in the axial direction besides the at least one filter membrane into the hollow space of the casing of the filtration module.

Preferably, the at least one filtration module comprises such a sealing at both regions near the front sides of the at least one filter membrane. Said both regions are arranged at opposite ends in axial direction. Hence, the hollow space inside the casing is circumscribed by said two sealings in axial direction.

Thereat, at least one front side of the at least one filter membrane is free from the sealing such that water can enter the at least one capillary of the at least one filter membrane in the axial direction. Thus, water can enter the hollow space inside the casing of the filter module only by entering the at least one capillary and passing through the substrate. Preferably, both front sides of the at least one filter membrane are free from the sealing such that water can enter the at least one capillary of the at least one filter membrane in the axial direction from both from sides.

Advantageously, the at least one filtration module is arranged in the tank such that the at least one front side of the at least one filter membrane that is free from the sealing is in contact with the water. That means, at least said front side of the at least one filter membrane that is free from the sealing is submerged in the water. Preferably, the at least one filtration module is arranged in the tank such that both front sides of the at least one filter membrane that are free from the sealing are in contact with the water.

According to an advantageous embodiment of the invention, the at least one filtration module is arranged in the tank such that the axial direction extends vertically.

Thereat, the at least one filtration module is arranged in the tank such that the at least one filtrate pipe extends out of the water.

According to another advantageous embodiment of the invention, the at least one filtration module is arranged in the tank such that the axial direction extends horizontally.

According to a preferred embodiment of the invention, the at least one filtration module is arranged in the tank such that the at least one filter membrane is submerged completely in the water. Thereat, the at least one filtration module is fixed such that movement within the tank is prevented.

Preferably, several filtration modules are provided in the filtration system, whereat the filtrate pipes of several filtration modules are connected to at least one collecting pipe. Thereat, the collecting pipe is the only connection between the several filtration modules. Hence, when installing the filtration system, the filtration modules can be lifted separately into the tank. When all filtration modules are placed in position, the filtration modules are connected to the common collecting pipe that can be arranged out of the water. Furthermore, in case of maintenance, only the collecting pipe has to be removed and single filtration modules can be lifted separately out of the tank.

Advantageously, a suction pump is provided for drawing water through the filtrate pipe of the at least one filtration module out of the tank. The suction pump is connected to the at least one filtrate pipe of the at least one filtration module or to the collecting pipe. The suction pump generates negative pressure, that means pressure which is smaller than atmospheric pressure, to draw water through the at least one filtrate pipe and through the at least one filter membrane out of the tank.

Integrity tests can be performed by pressuring the filtrate side of the filtration modules. Alternatively, a vacuum can be pulled on the filtrate side of the filtration modules by means of the suction pump. In this case, no additional equipment for integrity tests is necessary. Furthermore, cleaning of the filter membranes can be performed by filling the tank with cleaning agent and sucking the cleaning agent through the filter membranes by means of the suction pump. The cleaning agent can be fed back to the tank.

A further object of the invention is to provide a method for filtering water with a high flow rate of filtered water whereat the filtered water has high quality.

This object of the invention is achieved by a method for filtering water by means of a filtration system according to the invention. Thereat, the water to be filtered is drawn into the at least one capillary of the at least one filter membrane, and from the at least one capillary through the substrate of the at least one filter membrane into the filtrate pipe, and from the filtrate pipe of the at least one filtration module out of the tank.

BRIEF DESCRIPTION OF THE DRAWINGS

For a better understanding of the afore-mentioned embodiments of the invention as well as additional embodiments thereof, reference is made to the description of embodiments below in conjunction with the appended drawings showing.

Hereinafter, preferred embodiments of the present invention will be described with reference to the drawings. The drawings only provide schematic views of the invention. Like reference numerals refer to corresponding parts, units or components throughout the figures unless indicated otherwise.

DESCRIPTION OF EMBODIMENTS

Figure 1:
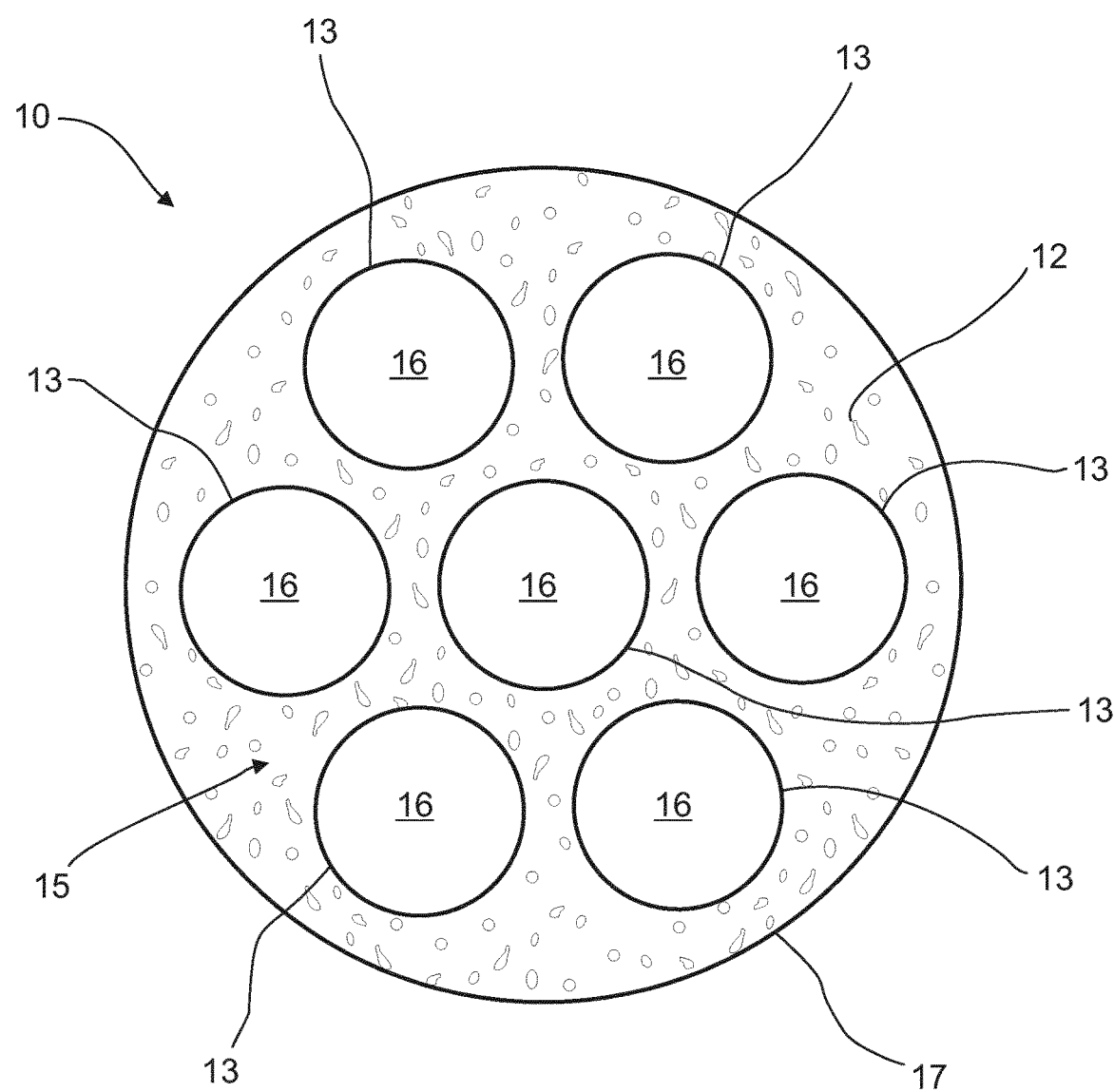
FIG. 1 a schematically given top view at a filter membrane.

FIG. 1 shows a schematically given top view at a filter membrane 10. The filter membrane 10 has a cylindrical shape, in particular a circular cylindrical shape, which extends in an axial direction x. A front side 15 of the filter membrane 10 extends perpendicular to said axial direction x. The filter membrane 10 comprises a substrate 12 which is porous and semi-permeable. Thus, the substrate 12 allows permeate, such as pure water, to pass and holds back suspended particles or microorganisms as retentate. The substrate 12 can be made of a polymer, in particular a soluble thermoplastic polymer.

The filter membrane 10 comprises several capillaries 16 penetrating the substrate 12. In this embodiment, the filter membrane 10 comprises seven capillaries 16 that are arranged next to each other and that are surrounded by the substrate 12. Thereat, one of the capillaries 16 is arranged in the middle of the filter membrane 10, and the other six capillaries 16 form a regular hexagon. The seven capillaries 16 are separated from each other by parts of the substrate 12. The capillaries 16 extend parallel to each other in the axial direction x. Thereat, the capillaries 16 also have a cylindrical shape, in particular a circular cylindrical shape.

Each of the capillaries 16 forms an inner surface 13 within the substrate 12. Said inner surfaces 13 are directed towards the centres of the capillaries 16. The substrate 12 forms an outer surface 17 surrounding the substrate 12 which is directed outwards in a radial direction. Water to be filtered enters the substrate 12 through said inner surface 13 of the capillaries 16, passes through the substrate 12, and the water exits the substrate 12 through said outer surface 17. A sum of the areas of the inner surfaces 13 of all capillaries 16 within the substrate 12 is larger than an area of the outer surface 17.

Figure 2:
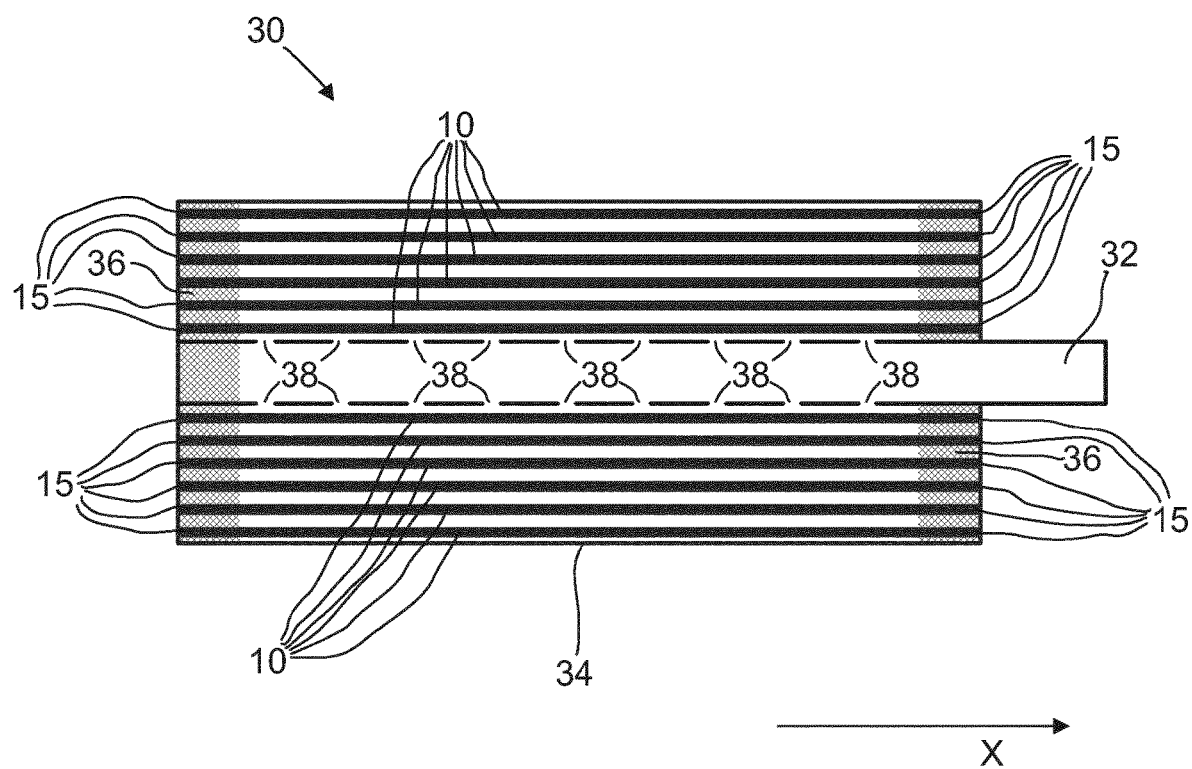
FIG. 2 a schematically given cross sectional view at a filtration module.

FIG. 2 shows a schematically given cross sectional view at a filtration module 30 that extends substantially in the axial direction x. The filtration module 30 comprises a casing 34 that is made of a material which is not porous and which is not permeable for water. For example, the casing 34 is made of Polyvinylchloride (PVC). The casing 34 has a hollow cylindrical shape that extends in the axial direction x and that defines a hollow space inside.

The filtration module 30 further comprises several filter membranes 10 as shown in FIG. 1 and one filtrate pipe 32. The filter membranes 10 and the filtrate pipe 32 are arranged such that the casing 34 surrounds the filter membranes 10 and the filtrate pipe 32 in circumferential direction. Thereat, the filtrate pipe 32 is arranged in a central area of the casing 34, and the filter membranes 10 surround the filtrate pipe 32. But also different arrangements of the filtrate pipe 32 and the filter membranes 10 are possible.

As mentioned already, the filter membranes 10 have a cylindrical shape and extend in the axial direction x. Both front sides 15 of the filter membranes 10 align with the front ends of the casing 34 in axial direction. The filtrate pipe 32 has a hollow cylindrical shape defining a hollow space inside. The filtrate pipe 32 also extends in the axial direction x. Thus, the filtrate pipe 32 extends parallel to the filter membranes 10. One front end of the filtrate pipe 32 aligns with one front end of the casing 34 in the axial direction x. The other front end of the filtrate pipe 32 overtops the casing 34 in the axial direction x.

The filtration module 30 comprises sealings 36 that are arranged within the casing 34 at both regions near the front sides 15 of the filter membranes 10. Said both regions are arranged at opposite ends of the casing 34 in the axial direction x. The sealings 36 each surround the filter membranes 10 and the filtrate pipe 32 in circumferential direction. The sealings 36 are made of a material which is not permeable for water, for example a resin. Hence, the hollow space inside the casing 34 is circumscribed by said two sealings 36 in axial direction x.

The front end of the filtrate pipe 32 which aligns with the front end of the casing 34 in axial direction x is also closed by means of the sealing 36. Within a region that is located inside the casing 34 and in axial direction x between the sealings 36, the filtrate pipe 32 is penetrated by openings 38 that extend in a radial direction. Hence, water that is located in the hollow space within the casing 34 can flow through said openings 38 into the hollow space within the filtrate pipe 32.

The front sides 15 of the filter membranes 10 are free from the sealings 36. Hence, water to be filtered can enter the capillaries 16 of the filter membranes 10 at the front sides 15 in the axial direction x. The water to be filtered then flows from the capillaries 16 through the substrates 12 of the filter membranes 10 into the hollow space within the casing 34. The water also flows from the hollow space within the casing 34 through the openings 38 into the hollow space within the filtrate pipe 32. The filtered water can be drawn out of the filtrate pipe 32, for example by means of a suction pump.

The sealings 36 prevent water from flowing in the axial direction x besides the filter membranes 10 into the hollow space of the casing 34 of the filtration module 30. Thus, water can enter the hollow space inside the casing 34 only by entering the capillaries 16 of the filter membranes 10 and passing through the substrates 12. Hence, only water that has been filtered by the filter membranes 10 may enter the hollow space within the filtrate pipe 32 and can be drawn out of the filtrate pipe 32.

Figure 3:
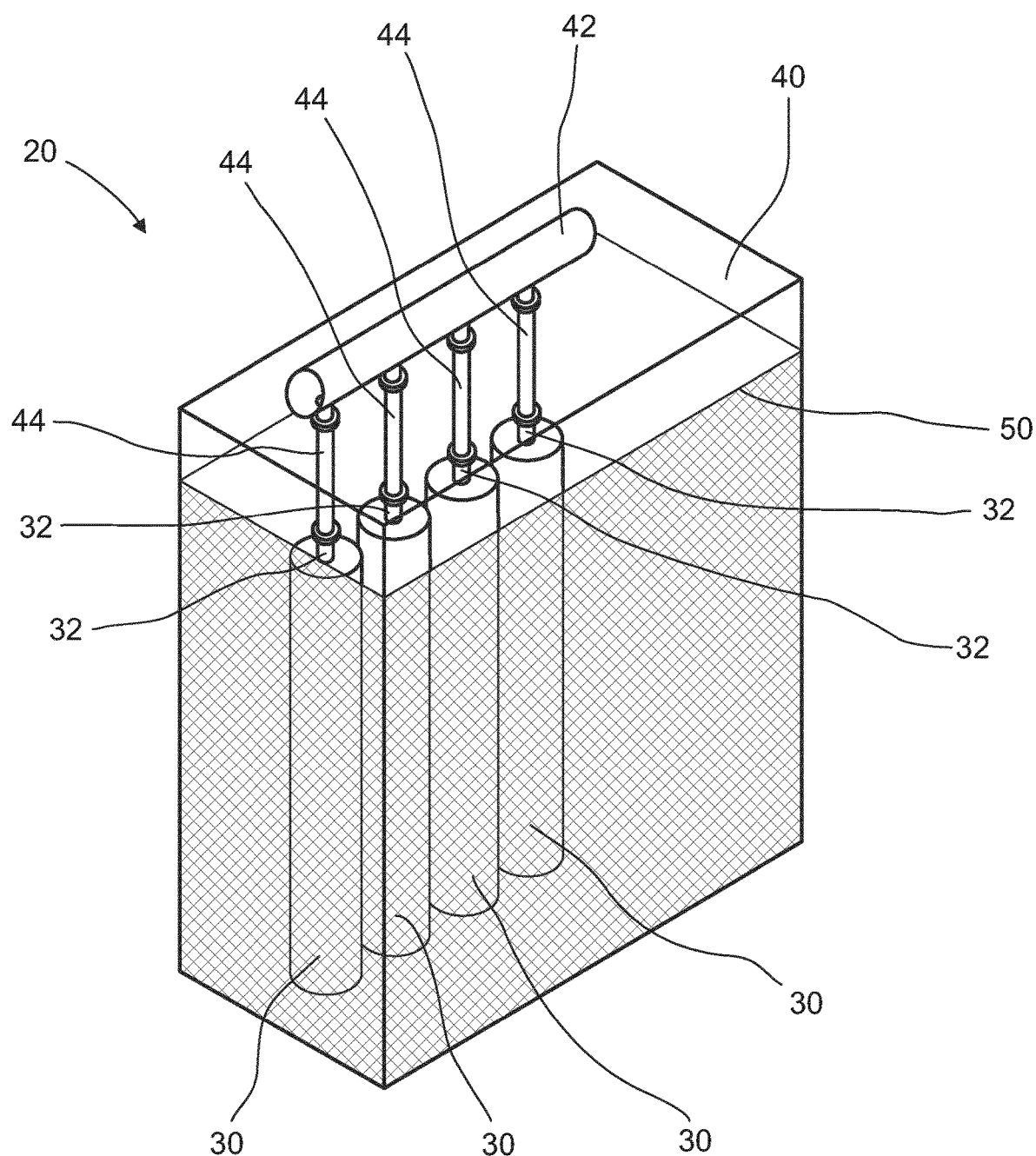
FIG. 3 a schematically given perspective semi-transparent view at a filtration system according to a first embodiment.

FIG. 3 shows a schematically given perspective semi-transparent view at a filtration system 20 according to a first embodiment. The filtration system 20 comprises a tank 40 that is filled with water to be filtered up to a water level 50. The filtration system 20 further comprises several filtration modules 30 as shown in FIG. 2. The filtration modules 30 each comprise several filter membranes 10 for filtering the water and a filtrate pipe 32 for drawing filtered water out of the tank 40.

The filtration modules 30 are arranged in the tank 40 such that the filter membranes 10 are submerged completely in the water. Hence, the filtration modules 30 are arranged in the tank 40 such that the front sides 15 of all filter membranes 10 are located below the water level 50. Thus, the front sides 15 of the filter membranes 10 are in contact with the water.

In this first embodiment, the filtration modules 30 are arranged in the tank 40 such that the axial direction x extends vertically. The filtration modules 30 are arranged within one line. Thereat, the filtrate pipes 32 of the filtration modules 30 extend above the water level 50 out of the water. The filtration modules 30 are fixed in the tank 40 such that movement within the tank 40 is prevented.

The filtrate pipes 32 of the filtration modules 30 are connected to a collecting pipe 42 via connection tubes 44. The collecting pipe 42 has a tubular shape and extends horizontally. Hence, the collecting pipe 42 extends perpendicular to the filtrate pipes 32 of the filtration modules 30. Thereat, the collecting pipe 42 is arranged above the water level 50 and hence outside of the water. The collecting pipe 42 is the only connection between the several filtration modules 30 that are arranged in one line.

A suction pump which is not shown here is provided for drawing filtered water out of the tank 40. The suction pump is connected to the collecting pipe 42. The suction pump generates negative pressure, that means pressure which is smaller than atmospheric pressure, in order to draw water through the collecting pipe 42, through the filtrate pipes 32 and through the filter membranes 10 out of the tank 40.

Figure 4:
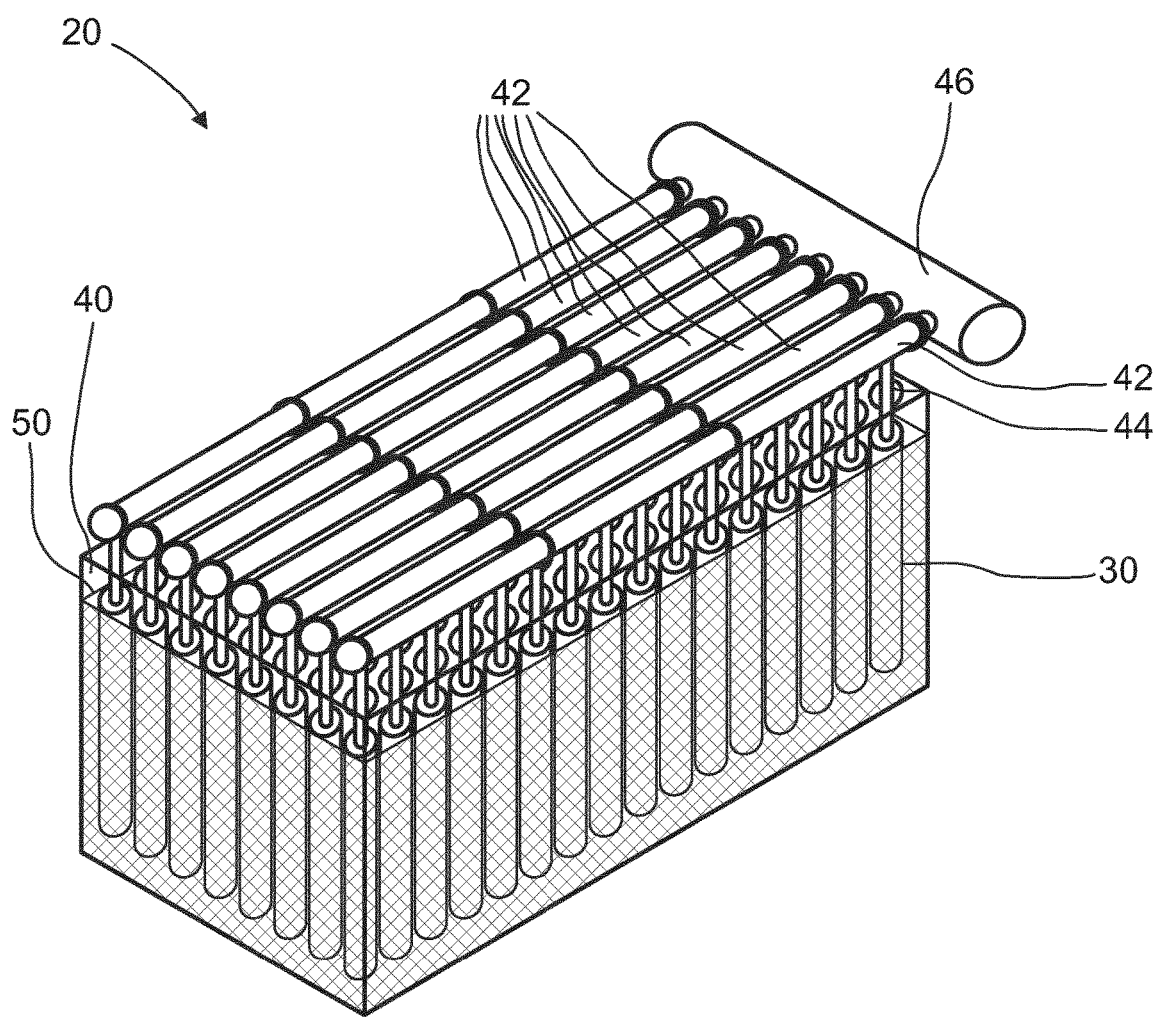
FIG. 4 a schematically given perspective semi-transparent view at a filtration system according to a second embodiment.

FIG. 4 shows a schematically given perspective semi-transparent view at a filtration system 20 according to a second embodiment. The filtration system 20 comprises a tank 40 that is filled with water to be filtered up to a water level 50. The filtration system 20 further comprises several filtration modules 30 as shown in FIG. 2. The filtration modules 30 each comprise several filter membranes 10 for filtering the water and a filtrate pipe 32 for drawing filtered water out of the tank 40.

The filtration modules 30 are arranged in the tank 40 such that the filter membranes 10 are submerged completely in the water. The filtration modules 30 are arranged in the tank 40 such that the front sides 15 of all filter membranes 10 are located below the water level 50. Thus, the front sides 15 of the filter membranes 10 are in contact with the water.

In this second embodiment, the filtration modules 30 are arranged in the tank 40 such that the axial direction x extends vertically. The filtration modules 30 are arranged within several lines that extend parallel to each other. Thereat, the filtrate pipes 32 of the filtration modules 30 extend above the water level 50 out of the water. The filtration modules 30 are fixed in the tank 40 such that movement within the tank 40 is prevented.

The filtrate pipes 32 of the filtration modules 30 which are arranged within the same line are connected to a collecting pipe 42 via connection tubes 44. Each collecting pipe 42 comprises several segments that are connected to one another by ferrules. The segments of the collecting pipe 42 each have a tubular shape and extend horizontally. Hence, the collecting pipe 42 extends perpendicular to the filtrate pipes 32 of the filtration modules 30. Thereat, the collecting pipe 42 is arranged above the water level 50 and hence outside of the water. The segments of the collecting pipe 42 are the only connection between the several filtration modules 30 that are arranged in one line.

As the 30 filtration modules 30 are arranged within several lines that extend parallel to each other, the filtration system 20 also comprises several collecting pipes 42 that extend parallel to each other. Thereat, each of the several collecting pipes 42 comprises several segments that are connected to one another by ferrules. The several collecting pipes 42 are connected to a collecting vessel 46. The collecting vessel 46 has a tubular shape and extends in a direction perpendicular to the collecting pipes 42. The collecting vessel 46 also extends in a direction perpendicular to the filtrate pipes 32. A diameter of the collecting vessel 46 is bigger than a diameter of the collecting pipes 42.

A suction pump which is not shown here is provided for drawing filtered water out of the tank 40. In this second embodiment, the suction pump is connected to the collecting vessel 46. The suction pump generates negative pressure, that means pressure which is smaller than atmospheric pressure, in order to draw water through the collecting vessel 46, through the collecting pipe 42, through the filtrate pipes 32 and through the filter membranes 10 out of the tank 40.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings and those encompassed by the attached claims. The embodiments were chosen and described in order to explain the principles of the invention and its practical applications, to thereby enable others skilled in the art to utilize the invention and various embodiments with various modifications as are suited to the particular use contemplated.

LIST OF REFERENCE NUMERALS 10 filter membrane
12 substrate
13 inner surface
15 front side
16 capillary
17 outer surface
20 filtration system
30 filtration module
32 filtrate pipe
34 casing
36 sealing
38 opening
40 tank
42 collecting pipe
44 connection tube
46 collecting vessel
50 water level
x axial direction

The invention claimed is:

1. Filtration system (20), comprising
a tank (40) filled at least partly with water to be filtered, and at least one filtration module (30),
the at least one filtration module (30) comprising at least one filter membrane (10) for filtering the water comprising a substrate (12) which is penetrated by at least one capillary (16), and
at least one filtrate pipe (32) for drawing filtered water out of the tank (40), whereat the at least one filtration module (30) is arranged in the tank (40) such that the at least one filter membrane (10) is submerged at least partly in the water to be filtered, wherein:
the at least one filtration module (30) is designed and arranged such that water to be filtered flows into the at least one capillary (16) and from the at least one capillary (16) through the substrate (12) into the filtrate pipe (32);
the at least one filter membrane (10) has a cylindrical shape extending in an axial direction (x), with the at least one capillary (16) also extending in the axial direction (x);
the at least one filtration module (30) comprises a casing (34) extending in the axial direction (x) and surrounding the at least one filter membrane (10) and the at least one filtrate pipe (32) in circumferential direction;
the at least one filtration module (30) comprises first and second sealings (36), wherein the first and second sealings (36) are arranged, respectively, within the casing (34) near a lower front side (15) and near an upper front side (15) of the at least one filter membrane (10), wherein each of the first and second sealings (36) surrounds the at least one filter membrane (10) and the at least one filtrate pipe (32) in a circumferential direction;
the lower front side (15) and the upper front side (15) of the at least one filter membrane (10) are free, respectively, from the first and second sealings (36) such that water can enter the at least one capillary (16) in the axial direction (x) from the lower front side (15) and the upper front side (15);
the at least one filtration module (30) is arranged in the tank (40) such that at least one of the lower front side (15) and the upper front side (15) of the at least one filter membrane (10) is in contact with the water;
the filtration system (20) is configured to draw water from the lower front side;
a suction pump is provided for drawing water through the filtrate pipe (32) of the at least one filtration module (30) out of the tank (40); and
the suction pump is connected to the at least one filtrate pipe of the at least one filtration module or to at least one collecting pipe, the suction pump is configured to generate negative pressure, being smaller than atmospheric pressure, to draw water through the at least one filtrate pipe and through the at least one filter membrane out of the tank.

2. Filtration system (20) according to claim 1, characterized in that the at least one filter membrane (10) comprises several capillaries (16) penetrating the substrate (12), whereat the several capillaries (16) are separated from each other by parts of the substrate (12).

3. Filtration system (20) according to claim 1, characterized in that the at least one filtrate pipe (32) extends in the axial direction (x) parallel to the at least one filter membrane (10), and in that the at least one filtrate pipe (32) is penetrated by openings (38) extending in a radial direction such that water flows from the at least one filter membrane (10) through the openings (38) into the at least one filtrate pipe (32).

4. Filtration system (20) according to claim 1, characterized in that the at least one filtration module (30) is arranged in the tank (40) such that the axial direction (x) extends vertically.

5. Filtration system (20) according to claim 4, characterized in that the at least one filtration module (30) is arranged in the tank (40) such that the at least one filtrate pipe (32) extends out of the water.

6. Filtration system (20) according to claim 1, characterized in that the at least one filtration module (30) is arranged in the tank (40) such that the axial direction (x) extends horizontally.

7. Filtration system (20) according to claim 6, characterized in that the at least one filtration module (30) is arranged in the tank (40) such that the at least one filter membrane (10) is submerged completely in the water.

8. Filtration system (20) according to claim 7, characterized in that several filtration modules (30) are provided, whereat the filtrate pipes (32) of several filtration modules (30) are connected to the at least one collecting pipe (42).

9. Filtration system (20) according to claim 1, wherein the filtration system (20) is configured to draw water from the lower front side (15) and the upper front side (15) of the at least one filter membrane (10).

10. Method for filtering water by means of a filtration system (20) according to claim 1, whereat the water to be filtered is drawn into the at least one capillary (16) and from the at least one capillary (16) through the substrate (12) into the filtrate pipe (32) and from the filtrate pipe (32) out of the tank (40).

* * * * *